United States Patent
Huang et al.

(10) Patent No.: US 10,584,797 B2
(45) Date of Patent: Mar. 10, 2020

(54) WATER VALVE AND POOL

(71) Applicant: BESTWAY INFLATABLES & MATERIAL CORP., Shanghai (CN)

(72) Inventors: Shuiyong Huang, Shanghai (CN); Wenhua Hu, Shanghai (CN); Zhibin Chen, Shanghai (CN); Changde Wan, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 74 days.

(21) Appl. No.: 15/889,558

(22) Filed: Feb. 6, 2018

(65) Prior Publication Data

US 2019/0195370 A1    Jun. 27, 2019

(30) Foreign Application Priority Data

Dec. 21, 2017    (CN) .................... 2017 2 1808621 U

(51) Int. Cl.
  *F16K 3/02*    (2006.01)
  *E04H 4/12*    (2006.01)
  *A61H 33/00*    (2006.01)

(52) U.S. Cl.
  CPC ............. *F16K 3/0227* (2013.01); *E04H 4/12* (2013.01); *E04H 4/1281* (2013.01); *A61H 33/6063* (2013.01); *A61H 2033/0037* (2013.01)

(58) Field of Classification Search
  CPC ..................... F16K 3/0227; E04H 4/1281
  USPC ............................................. 4/507
  See application file for complete search history.

(56) References Cited

U.S. PATENT DOCUMENTS

| | | | |
|---|---|---|---|
| 3,426,901 | A | 2/1969 | Sherper |
| 3,792,979 | A | 2/1974 | Clinton |
| 4,419,233 | A | 12/1983 | Baker |
| 4,473,533 | A | 9/1984 | Davey |
| 4,630,634 | A | 12/1986 | Sasaki et al. |
| 4,822,571 | A | 4/1989 | Nicholson et al. |
| 4,825,528 | A | 5/1989 | Nicholson et al. |
| 4,828,803 | A | 5/1989 | Nicholson et al. |
| 4,828,804 | A | 5/1989 | Nicholson et al. |

(Continued)

FOREIGN PATENT DOCUMENTS

WO    2006013449    2/2006

OTHER PUBLICATIONS

European Search Report dated Jul. 16, 2018, 2 pages.

*Primary Examiner* — Christine J Skubinna

(74) *Attorney, Agent, or Firm* — AJ Moss; Dickinson Wright PLLC

(57) ABSTRACT

A water valve and a pool are provided. The water valve includes a valve body having a first channel; and a valve plate having a valve plate opening and configured to control opening or closing of the first channel by sliding; when the valve plate is in a first position, the valve plate opening is aligned with the first channel and water can flow through the first channel, the water valve is opened; when the valve plate is in a second position, the first channel is blocked by the valve plate, the water valve is closed. The pool includes a water inlet part connected with a pool wall and the water valve detachably connected with the water inlet part. The water valve is simple in operation, has good sealing performance and switch function of the water valve and disinfection function of the chemical dispenser, thereby improving the water valve's performance.

18 Claims, 13 Drawing Sheets

(56) References Cited

U.S. PATENT DOCUMENTS

| | | |
|---|---|---|
| 4,917,868 A | 4/1990 | Alexander et al. |
| 5,055,183 A | 10/1991 | Buchan |
| 5,118,418 A | 6/1992 | Roussel |
| 5,407,567 A | 4/1995 | Newhard |
| 5,476,116 A | 12/1995 | Price et al. |
| 5,704,079 A | 1/1998 | Desnoyers |
| 6,123,842 A | 9/2000 | Buchan |
| 6,162,407 A | 12/2000 | Pihl |
| 6,287,466 B1 | 9/2001 | Yassin |
| 6,432,371 B1 | 8/2002 | Oliver, Jr. |
| 6,592,766 B2 | 7/2003 | King |
| 7,017,886 B1 * | 3/2006 | Ngene-Igwe ......... F16K 3/0227 251/326 |
| 2006/0096639 A1 | 5/2006 | Coogle |
| 2008/0099387 A1 | 5/2008 | Pellington et al. |

* cited by examiner

WATER VALVE AND POOL

CROSS-REFERENCE TO RELATED APPLICATIONS

The present application claims the benefit of priority to Chinese Patent Application No. 201721808621.8, titled "WATER VALVE AND POOL", filed on Dec. 21, 2017, the entire disclosure of which are incorporated herein by reference.

TECHNICAL FIELD

The present disclosure relates to water valve field, and more particularly to a water valve applied to a pool and the pool including the water valve.

BACKGROUND

Above-ground pools are usually installed outdoors for use. Leaves, dust and other impurities may easily enter the pools and affect water quality. Therefore, a filter pump is usually connected with the above-ground pool to filter and clean the water. Normally, the filter pump may be connected with a water inlet and a water outlet of the above-ground pool via pipes to achieve water circulation. When the filter pump needs to be cleaned, and a filter cartridge of the filter pump needs to be replaced or to be cleaned, a plug may be used to block the water inlet and water outlet disposed on the pool wall to prevent water leakage.

However, the above method has many disadvantages. For example, it usually takes much effort to plug the plug into the water inlet and the water outlet of the pool and pull the plug out of the water inlet and the water outlet via an operation of a user in the pool, thereby increasing operation difficulty; secondly, if the plug is not firmly plugged into the water inlet and the water outlet, it is likely to result in leakage at the water inlet and the water outlet; thirdly, the plug is likely to be damaged or lost and so on.

Due to long-term outdoor use of the above-ground pool, plenty of bacteria and viruses may breed in the water, the conventional method for sterilization is to put sodium hypochlorite or other disinfection tablets directly into the water, or into a floating chemical dispenser, so that the disinfection tablets can be slowly dissolved to sterilize and disinfect the water. However, the disinfection tablets may sink to a bottom of the pool after being directly put into the water, since the water is relatively static when the pool is not in use, the dissolved tablets can only diffuse to a small area near the disinfection tablets. Similarly, when a chemical dispenser is applied to dispense disinfectants, the chemical dispenser may drift to corners of the pool under the force of wind and the dissolved disinfectants cannot diffuse over a large area either. A common disadvantage of the above two methods for discharge disinfectants lies in that, the dissolved disinfectants cannot diffuse to a larger area, thereby affecting a disinfection effect of water.

SUMMARY

A water valve and a pool are provided in the present disclosure, so as to solve the problems of difficulty in operation and water leakage of pool when using plugs to control water inflow and water outflow of the pool in a conventional technology.

In some embodiments, the water valve may include: a valve body, provided with a first channel; and a valve plate, provided with a valve plate opening and configured to control opening or closing of the first channel by sliding; wherein when the valve plate is positioned in a first position, the valve plate opening is aligned with the first channel so that water can flow through the first channel, and the water valve is in an open state; and when the valve plate is positioned in a second position, the first channel is blocked by the valve plate so that water cannot flow through the first channel, and the water valve is in a closed state.

In some embodiments, the valve body may include: a valve seat, provided with a first pipe; and a valve housing, detachably connected with the valve seat and including a second pipe; wherein a pipe channel of the first pipe and a pipe channel of the second pipe collectively define the first channel, the valve plate is disposed between the first pipe and the second pipe, and when the valve plate opening is aligned with the pipe channel of the first pipe and the pipe channel of the second pipe, the first pipe is communicated with the second pipe.

In some embodiments, a first opening and a second opening are disposed on the valve seat, and the valve plate passes through the first opening and the second opening and is configured to slide within the first opening and the second opening.

In some embodiments, the water valve may further include: a first limit assembly, configured to limit movement of the valve plate in a first predetermined direction, when the valve plate is positioned in the first position; wherein the first limit assembly may include a slot disposed on the valve plate and a hook disposed on the valve seat, and the hook may include a vertical plane and an oblique plane, when the valve plate is positioned in the first position, the vertical plane of the hook abuts against an end of the slot.

In some embodiments, the water valve may further include: a second limit assembly disposed at an end of the valve plate and configured to abut against the valve seat to limit movement of the valve plate in a second predetermined direction when the valve plate is positioned in the second position.

In some embodiments, the water valve may further include: a stop plate disposed on the valve seat, wherein the stop plate and the valve seat define a slideway of the valve plate, and the valve plate is disposed between the stop plate and the valve seat.

In some embodiments, the water valve may further include: a third limit assembly, wherein the valve plate is positioned in the first position or the second position via the third limit assembly; and the third limit assembly may include: a first groove and a second groove disposed on the stop plate, and a protrusion disposed on the valve plate, wherein the first groove and the second groove are disposed at an interval along a sliding direction of the valve plate, when the protrusion slides into the first groove, the valve plate is positioned in the first position, and when the protrusion slides into the second groove, the valve plate is positioned in the second position.

In some embodiments, the water valve may further include: a sealing ring, disposed at an end of the first pipe near the valve plate; and/or a ring-shaped rib, disposed on the valve plate, wherein the ring-shaped rib abuts against the sealing ring when the valve plate is positioned in the second position.

In some embodiments, the water valve may further include a chemical dispenser connected with the valve body, wherein the chemical dispenser is provided with a chamber for receiving solid chemicals and at least one first hole configured to make the chamber communicated with an external environment.

In some embodiments, the chemical dispenser is further provided with a second channel communicated with the first channel and at least one second hole configured to make the chamber communicated with and the second channel, and chemical solution in the chamber can be discharged via the at least one second hole when water flows through the second channel.

In some embodiments, the chemical dispenser may further include: a first housing, detachably connected with the valve body and including a third pipe; and a second housing, detachably connected with the first housing and including a fourth pipe; wherein the first housing and the second housing collectively define the chamber, the third pipe and the fourth pipe are connected and collectively define the second channel, and the at least one second hole is disposed on the fourth pipe.

In some embodiments, the chemical dispenser may further include a control member detachably connected with the second housing and configured to open or close the at least one second hole.

In some embodiments, the control member may include: a fifth pipe and a hand wheel connected with one end of the fifth pipe, the other end of the fifth pipe is configured to be inserted into the fourth pipe and rotated in the fourth pipe, and the hand wheel is configured to be rotated by a user so as to rotate the fifth pipe; and at least one third hole is disposed on the fifth pipe, when the at least one third hole is overlapped with the at least one second hole, the at least one second hole is opened, and when the at least one third hole and the at least one second hole are non-overlapped, the at least one second hole is closed.

A pool is also provided according to embodiments of the present disclosure. The pool may include a water inlet part, connected with a pool wall; and the aforementioned water valve, wherein the water valve is detachably connected with the water inlet part.

In some embodiments, the water inlet part may include a water pipe part and a connecting part connected with the water pipe part, the connecting part is connected with the pool wall, and at least a part of the water valve is configured to be inserted into the water pipe part.

Compared with the prior art, the present disclosure has the following advantages.

The water valve according to embodiments of the present disclosure includes a valve body and a valve plate, wherein the valve body is provided with a first channel, the valve plate is provided with a valve plate opening, and alignment between the first channel and the valve plate opening is controlled by sliding the valve plate so as to control opening or closing of the water valve. The operation is simple and easy to implement.

Further, the water valve includes a chemical dispenser connected with the valve body, the chemical dispenser has a second chamber for receiving solid chemicals and at least one first hole configured to make the second chamber communicated with an external environment, and the chemical dispenser is further provided with a second channel communicated with the first channel and at least one second hole configured to make the second chamber communicated with and the second channel. A negative pressure will be generated when water flows through the second channel, which may suck chemical solution out of the second chamber via the at least one second hole and the chemical solution may further flow out of the second channel under the water flow effect. Therefore, the water valve according to the embodiments of the present disclosure is an integrated system of the valve body and the chemical dispenser, which not only has a switch function of the valve body to control opening and closing of water flow, but also has a disinfection function of the chemical dispenser to dispense chemical solution so as to sterilize water in the surrounding environment.

Further, the water valve includes: the first limit assembly configured to limit movement of the valve plate in a first predetermined direction when the valve plate is positioned in the first position; and the second limit assembly, configured to abut against the valve seat when the valve plate is positioned in the second position to limit movement of the valve plate in a second predetermined direction, where the first predetermined direction is opposite to the second predetermined direction, thereby preventing the valve plate from slipping out of the valve body or missing which may result in water leakage.

Further, a stop plate is further disposed on the valve seat, a first groove and a second groove are disposed on the stop plate, a protrusion is disposed on the valve plate, and the protrusion, the first groove and the second groove constitute the third limit assembly to stably keep the water valve in an open or closed state so as to prevent the valve plate from sliding near the first position or the second position, thereby improving performance of the water valve.

Further, a sealing ring is disposed at an end of the first pipe near the valve plate, and a ring-shaped rib is disposed on the valve plate. When the valve plate is positioned at the second position, the ring-shaped rib abuts against the sealing ring to prevent the water valve from leakage, thereby achieving good sealing performance of the water valve.

The pool according to embodiments of the present disclosure may include a water inlet part and the water valve, wherein the water inlet part may include a water pipe part and a connecting part connected with the water pipe part, at least a part of the water valve is configured to be inserted into the water pipe part. That is, the water valve can be connected with the water inlet part of the pool instead of a plug, so as to act as a switch for controlling opening or closing of water flow. Since it is simple and labor-saving to operate the valve plate to control the opening or closing of the water valve, difficulty in operation can be avoided when a user inserts the plug into or pulls the plug out of a water inlet or a water outlet of the pool. Additionally, since the water valve and the water inlet part are hermetically connected, and the valve plate is hermetically connected with the first pipe when positioned in the second position, water leakage can be avoided when the water valve is in a closed state.

Further, the water valve of the pool may further include a chemical dispenser, and the chemical solution in the chemical dispenser can be sucked out and discharged to the pool via the second channel. The water valve is an integrated system of the valve body and the chemical dispenser, which not only has a switch function of the valve body to control opening and closing of water flow, but also has a disinfection function of the chemical dispenser to dispense chemical solution so as to sterilize water in the pool. In addition, since the chemical dispenser is connected with the valve body, the valve body is connected with the water inlet part of the pool, a position of the chemical dispenser is relatively fixed and the chemical solution in the chemical dispenser can diffuse to a larger area under effect of water flow of the water inlet part, which not only avoids easy sinking of the conventional disinfectant tablets into a bottom of the pool and its failure in diffusing to a large area of the pool, but also solves the problem of the conventional floating chemical dispenser drifting to corners of the pool under wind force and influencing the disinfection effect. Therefore, the chemical dispenser disposed in the water valve according to embodiments of the present disclosure enhances the disinfection effect of the water.

DETAILED DESCRIPTION

The foregoing objects, features and advantages of the present invention will become more apparent from the following detailed description of specific embodiments in conjunction with the accompanying drawings.

A water valve is provided according to embodiments of the present disclosure.

Figure 1:
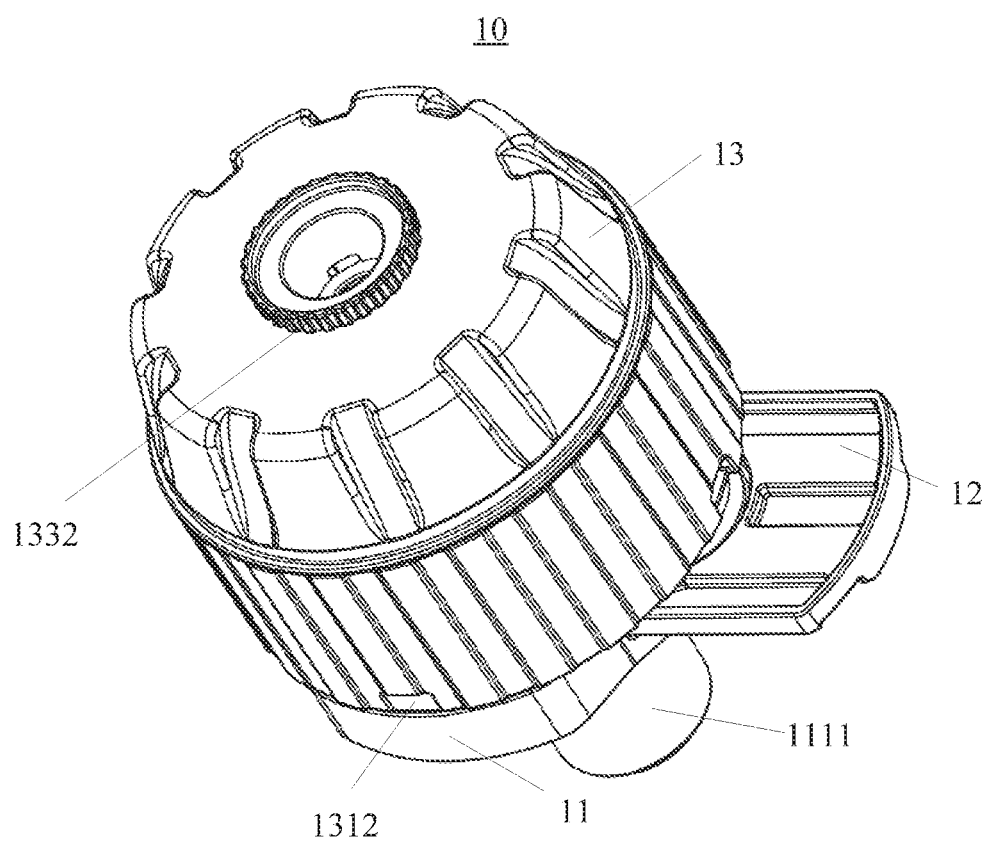
FIG. 1 schematically illustrates a stereogram of a water valve 10 according to an embodiment of the present disclosure.
Figure 2:
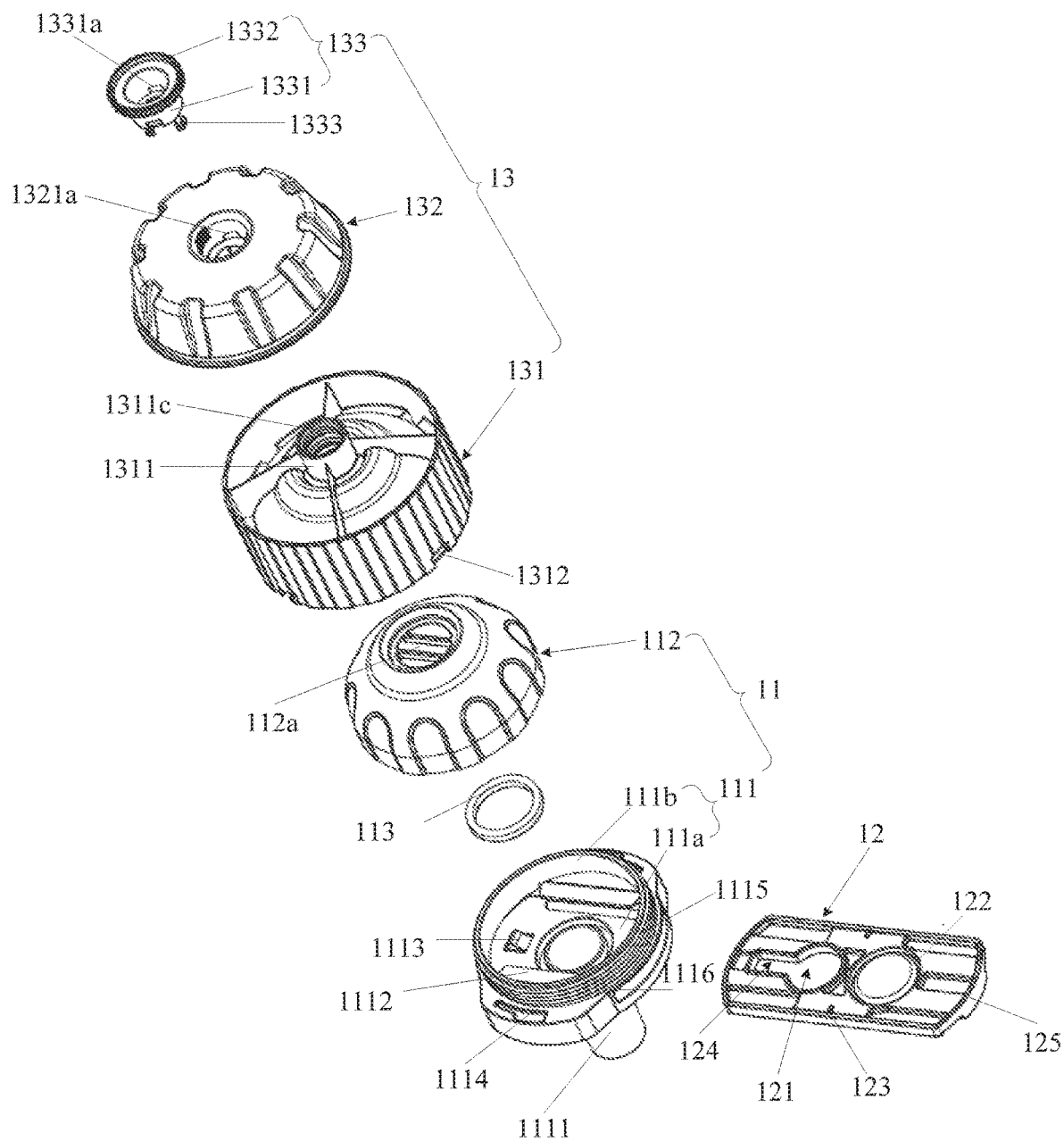
FIG. 2 schematically illustrates a first exploded view of the water valve 10 according to the embodiment shown in FIG. 1.
Figure 3:
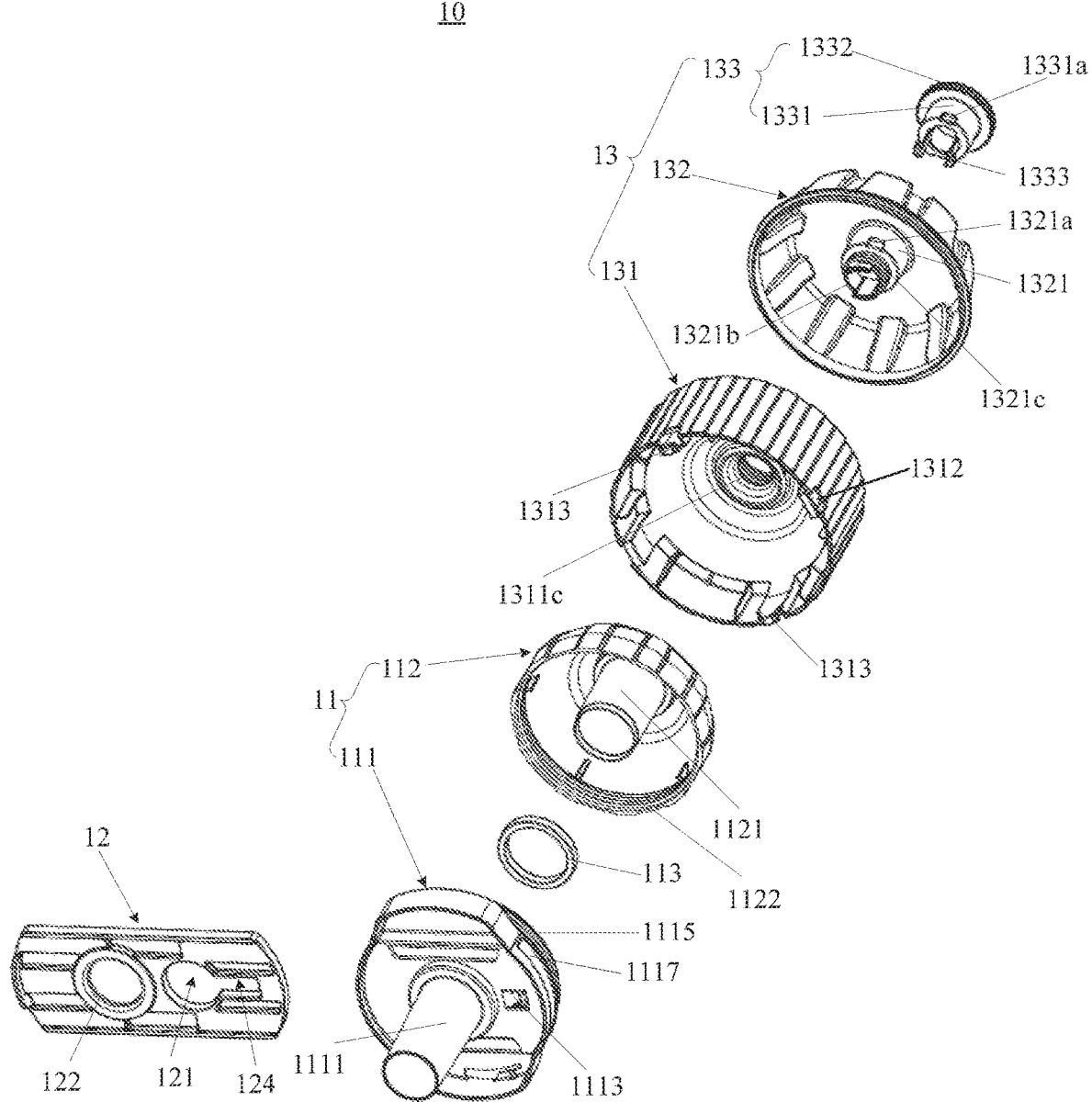
FIG. 3 schematically illustrates a second exploded view of the water valve 10 according to the embodiment shown in FIG. 1.

Referring to FIGS. 1 to 3, FIG. 1 schematically illustrates a stereogram of a water valve 10 according to an embodiment of the present disclosure. FIGS. 2 and 3 respectively illustrate a first exploded view and a second exploded view of the water valve 10 according to the embodiment shown in FIG. 1.

In some embodiments, the water valve 10 may include a valve body 11 and a valve plate 12, where the valve body 11 may include a valve seat 111 and a valve housing 112, the valve seat 111 may be provided with a first pipe 1111, and the valve housing 112 may include a second pipe 1121. The valve seat 111 and the valve housing 112 may be detachably connected via a first connecting assembly, and the first connecting assembly may include an external thread 1115 disposed on an outer surface of a side wall of the valve seat 111, and an internal thread 1122 disposed on an inner surface of a side wall of the valve housing 112.

In some embodiments, the valve seat 111 may include a bottom portion 111a and a side wall 111b, where a lower edge of the side wall 111b may be connected with an outer edge of the bottom portion 111a, a first opening 1116 and a second opening 1117 are symmetrically disposed on the side wall 111b, and the valve plate 12 passes the first opening 1116 and the second opening 1117 and is configured to slide within the first opening 1116 and the second opening 1117.

Figure 4:
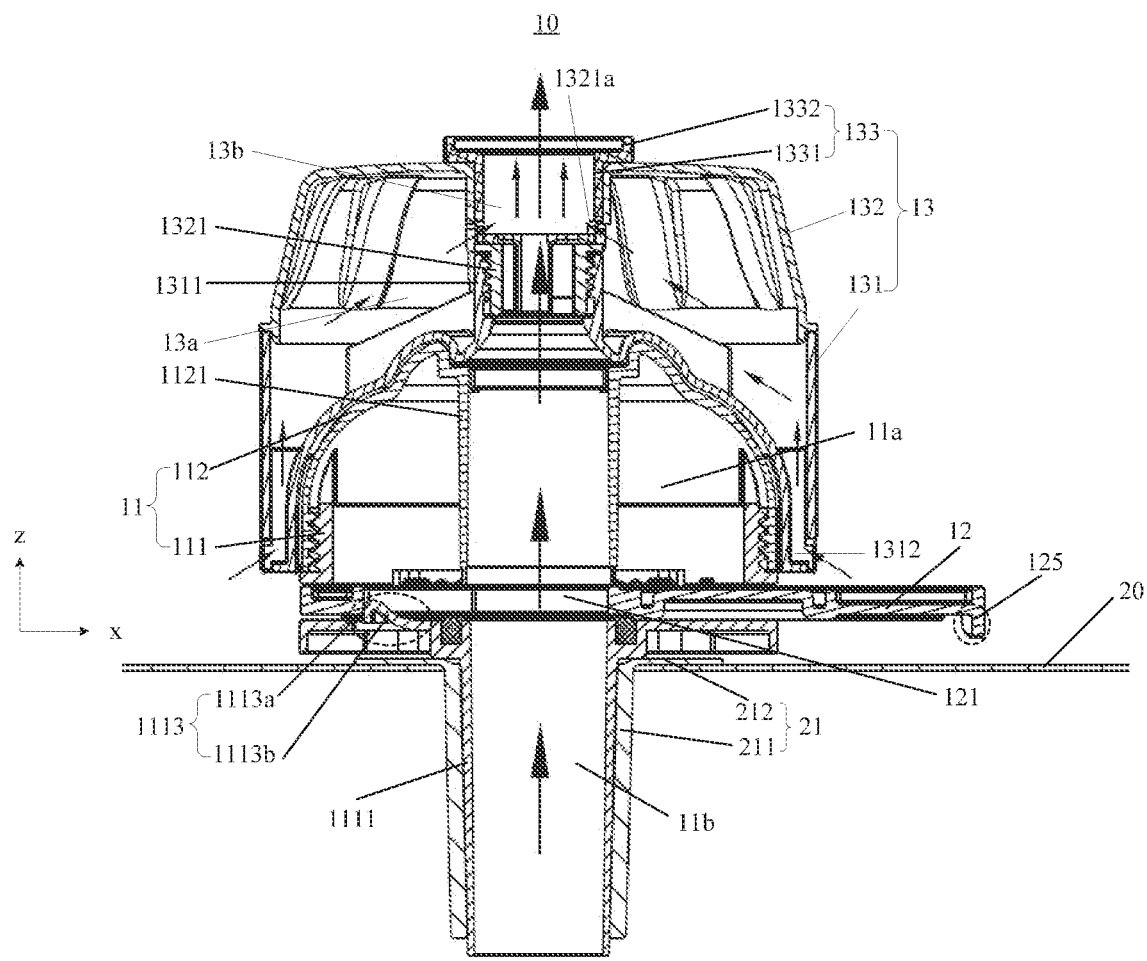
FIG. 4 schematically illustrates a cross-sectional view of the water valve 10 according to the embodiment shown in FIG. 1 when a valve plate 12 is in a first position.
Figure 5:
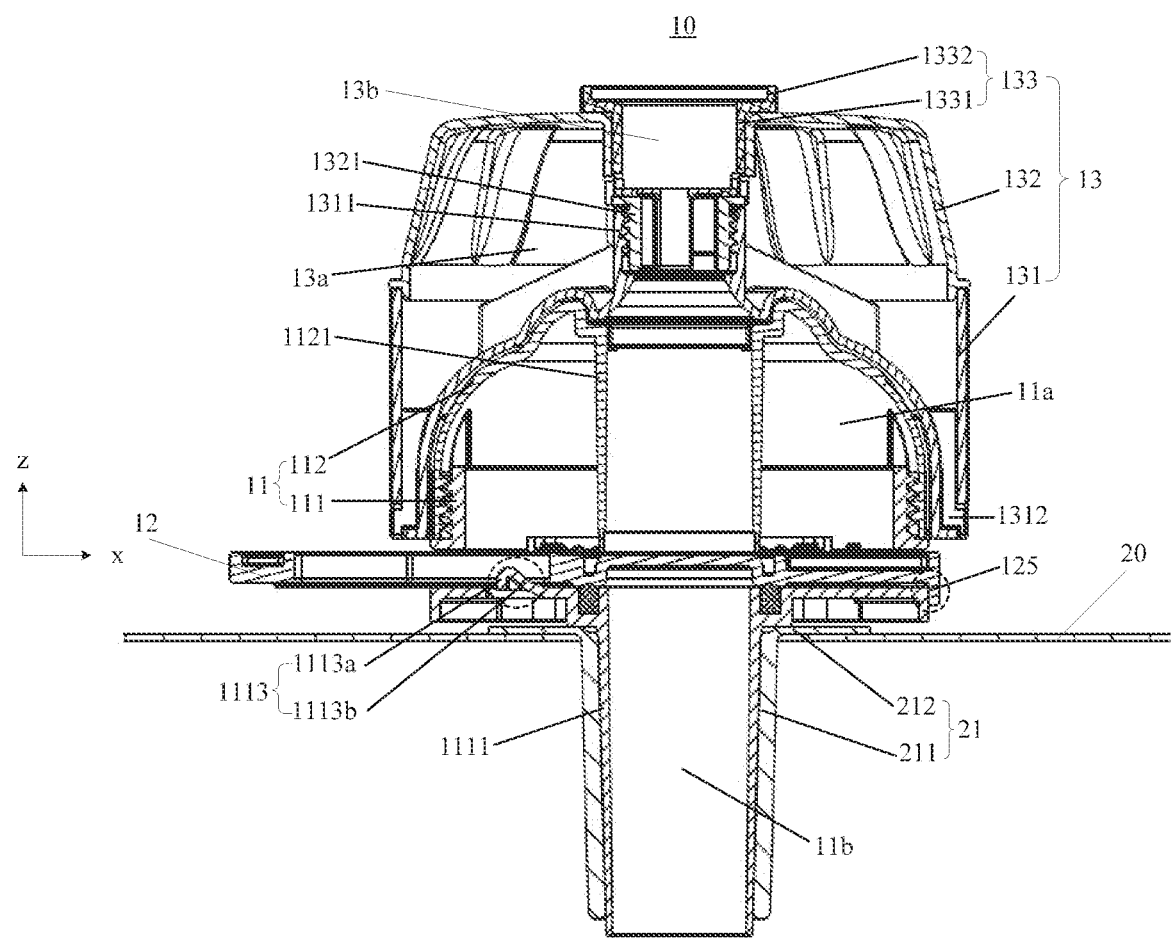
FIG. 5 schematically illustrates a cross-sectional view of the water valve 10 shown in FIG. 1 when the valve plate 12 is in a second position.

Referring to FIGS. 4 and 5, FIG. 4 schematically illustrates a cross-sectional view of the water valve 10 according to the embodiment shown in FIG. 1 when a valve plate 12 is in a first position, FIG. 5 schematically illustrates a cross-sectional view of the water valve 10 shown in FIG. 1 when the valve plate 12 is in a second position. The valve seat 111 and the valve housing 112 collectively define a first chamber 11a, and the second pipe 1121 is disposed in the first chamber 11a. A pipe channel of the first pipe 1111 and a pipe channel of the second pipe 1121 collectively define a first channel 11b, the valve plate 12 is disposed between the first pipe 1111 and the second pipe 1121, the valve plate 12 is provided with a valve plate opening 121 (as shown in FIG. 2 and FIG. 3), and when the valve plate opening 121 is aligned with the pipe channel of the first pipe 1111 and the pipe channel of the second pipe 1121, the first pipe 1111 is communicated with the second pipe 1121.

In some embodiments, a user may control opening or closing of the first channel 11b by sliding the valve plate 12, so as to control the opening and closing of the water valve 10. Specifically, referring to FIG. 4, when the valve plate 12 is positioned in the first position, the valve plate opening 121 is aligned with the first channel 11b and water can flow through the first channel 11b (a direction of the water flow is indicated by arrows in FIG. 4), the water valve 10 is in an open state. Referring to FIG. 5, when the valve plate 12 is positioned in the second position, the first channel 11b is blocked by the valve plate 12, and water cannot flow through the first channel 11b, the water valve 10 is in a closed state.

In some embodiments, a diameter of an opening at an end of the second pipe 1121 in contact with the valve plate 12 may be equal to a diameter of the valve plate opening 121, and a diameter of an opening at an end of the first pipe 1111 in contact with the valve plate 12 may be equal to the diameter of the valve plate opening 121. In other embodiments, the diameter of the opening at the end of the second pipe 1121 in contact with the valve plate 12 may be greater than the diameter of the valve plate opening 121, and the diameter of the opening at the end of the first pipe 1111 in contact with the valve plate 12 may be greater than the diameter of the valve plate opening 121.

In some embodiment, an opening 112a (as shown in FIG. 2) is also disposed at an end of the second pipe 1121 away from the valve plate 12. In other embodiments, a grid may be disposed in the opening 112a. It will be appreciated that, embodiments of the present disclosure are not limited thereto.

In other embodiments, the second pipe 1121 may be not provided, and water may flow out of the first pipe 1111 and enter a chamber formed by the valve seat 111 and the valve housing 112, and then flow out of an opening at an end of the valve housing 112 away from the valve seat 111.

In the water valve according to embodiments of the present disclosure, the water valve is opened or closed by sliding the valve plate which may control alignment between the first channel and the valve plate opening. The operation is simple and easy to implement.

Figure 6:
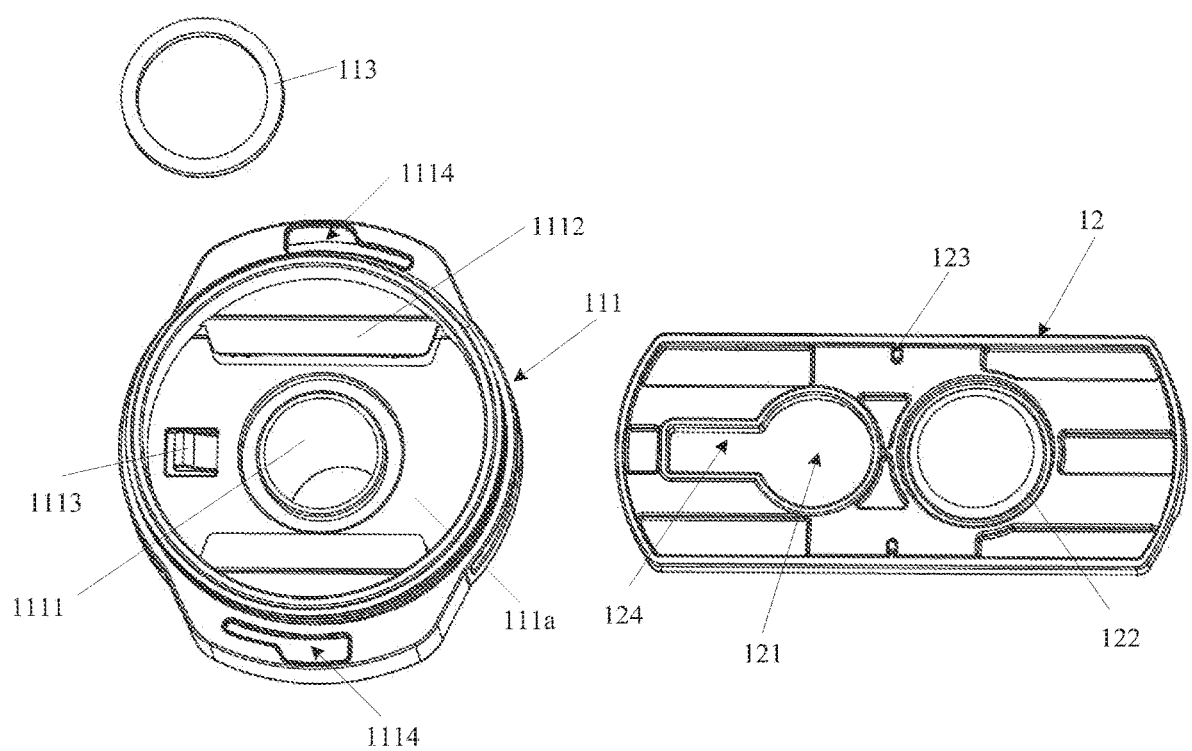
FIG. 6 schematically illustrates a structural diagram of a valve seat 111 and the valve plate 12 of the water valve 10 according to the embodiment shown in FIG. 1.

Referring to FIG. 6, FIG. 6 schematically illustrates a structural diagram of the valve seat 111 and the valve plate 12 of the water valve 10 according to the embodiment shown in FIG. 1. In some embodiments, the valve seat 111 further includes a stop plate 1112, where the stop plate 1112 and the valve seat 111 collectively define a slideway of the valve plate 12, and the valve plate 12 is disposed between the stop plate 1112 and the valve seat 12 and configured to slide between the first position and the second position. Specifically, two stop plates 1112 may be symmetrically disposed on the valve seat 111, and a dimension of the slideway of the valve plate 12, a dimension of the first opening 1116 (as shown in FIGS. 2 and 3) and a dimension of the second opening 1117 (shown in FIGS. 2 and 3) respectively along a direction perpendicular to a slide direction of the valve plate 12 may be the same.

In some embodiments, a seal ring 113 may be disposed on an opening at an end of the first pipe 1111 near the valve plate 12, so that when the valve plate 12 is in the second position, the valve plate 12 can be hermetically contacted with the end of the first pipe 1111. A ring-shaped rib 122 may be further disposed on the valve plate 12, when the valve plate 12 is positioned at the second position, the ring-shaped rib 122 may abut against the seal ring 113 to enhance sealing performance between the valve plate 12 and the end of the first pipe 1111. A diameter of an opening at an end of the first pipe 1111, a diameter of the sealing ring 113, and a diameter of the ring-shaped rib 122 may be the same.

In some embodiments, the water valve 10 may further include a first limit assembly configured to limit movement of the valve plate 12 in a first predetermined direction, when the valve plate 12 is positioned in the first position. Specifically, the first limit assembly may include a first slot 124 disposed on the valve plate 12 and a first hook 1113 disposed on the valve seat 111, where one end of the first slot 124 may be communicated with the valve plate opening 121, and the other end of the first slot 124 may be enclosed. A hole (not shown) may be disposed on the bottom portion 111a of the valve seat 111, the first hook 1113 may be disposed in the hole, and one end of the first hook 1113 may be connected with a portion of the hole, and the other end of the first hook 1113 may protrude out of an upper surface of the bottom portion 111a of the valve seat 111. Specifically, the hole may be rectangle-shaped.

Figure 7:
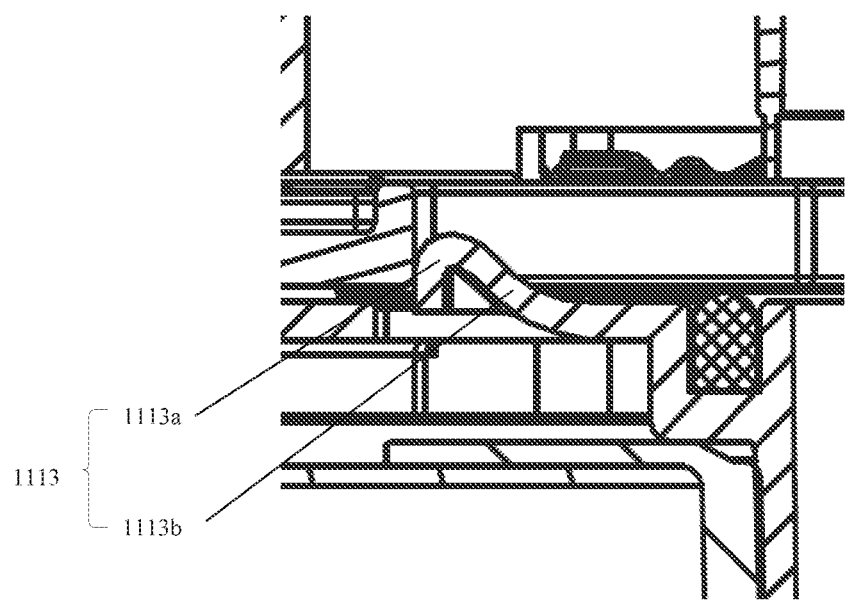
FIG. 7 schematically illustrates a partially enlarged view of a first hook 1113 of the water valve 10 according to the embodiment shown in FIG. 4.

Referring to FIG. 7, FIG. 7 schematically illustrates a partially enlarged view of the first hook 1113 of the water valve 10 according to the embodiment shown in FIG. 4. In some embodiments, the first hook 1113 may include a vertical plane 1113a and an oblique plane 1113b, when the valve plate 12 is positioned in the first position, the vertical plane 1113a of the first hook 1113 abuts against one end of the first slot 124 to limit movement of the valve plate 12 along a positive x-axis direction as shown in FIG. 4.

In some embodiments, the water valve 10 may further include a second limit assembly disposed at one end of the valve plate 12 and configured to abut against the valve seat 111 when the valve plate 12 is positioned in the second position, so as to limit movement of the valve plate 12 along a second predetermined direction. Specifically, referring to FIG. 5, the second limit assembly may be a flange 125 at one end of the valve plate 12, and when the valve plate 12 is positioned in the second position, the flange 125 abuts against one side of the valve seat 111 so as to limit movement of the valve plate 12 along a negative x-axis direction as show in FIG. 5.

It can be seen from the above that, the first predetermined direction is opposite to the second predetermined direction, that is, the sliding movements of the valve plate 12 along the positive x-axis direction and the negative x-axis direction are both limited, and the valve plate 12 can only slide between the first position and the second position, thereby preventing the valve plate 12 from slipping out of the valve body 11 and missing which may result in water leakage.

Figure 8:
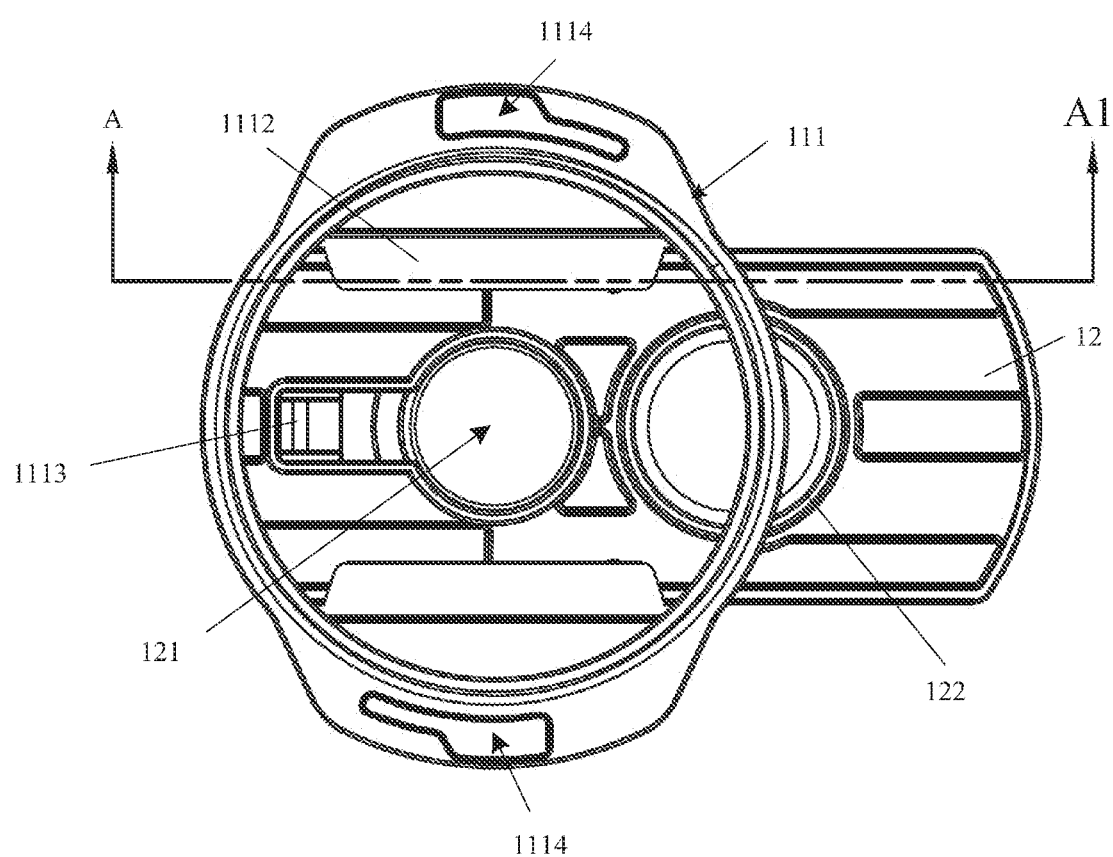
FIG. 8 schematically illustrates a top view of the valve seat 111 and the valve plate 12 of the water valve 10 according to the embodiment shown in FIG. 1 when the valve plate 12 is in the first position.
Figure 9:
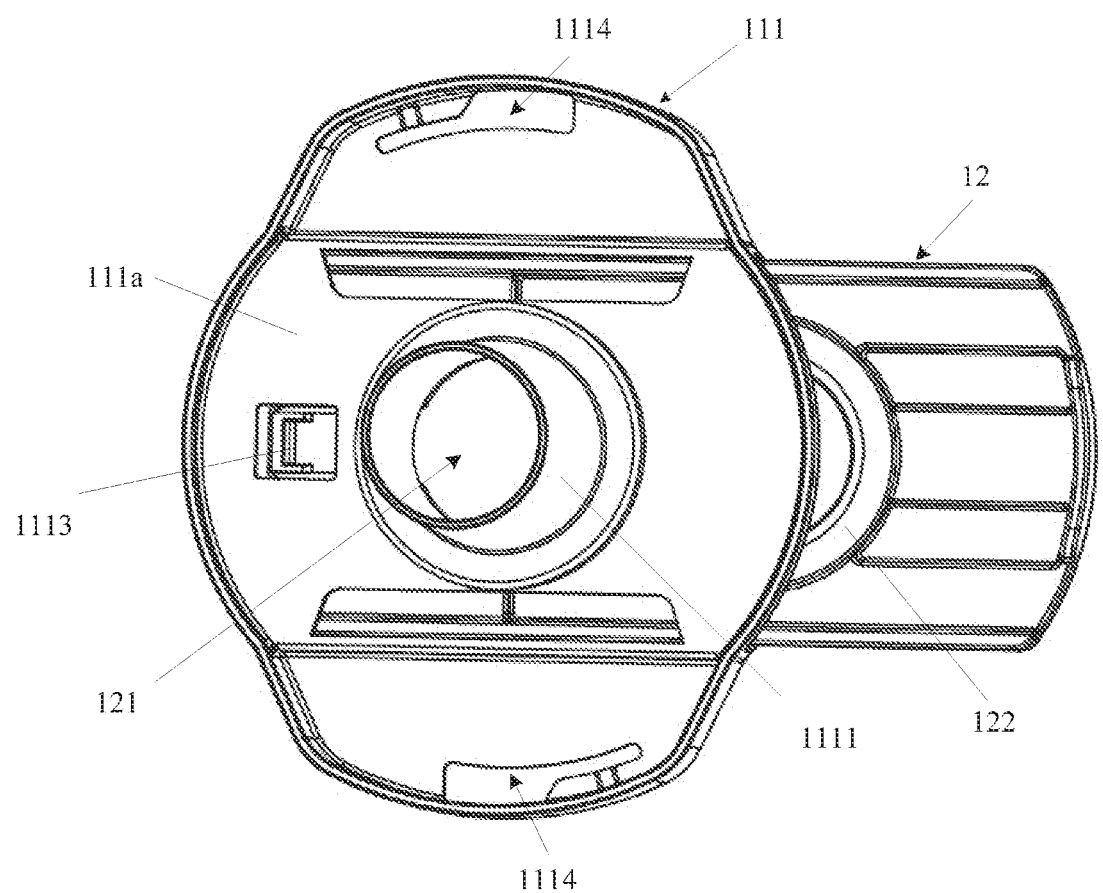
FIG. 9 schematically illustrates a structural diagram of the valve seat 111 and the valve plate 12 of the water valve 10 in another perspective according to the embodiment shown in FIG. 1 when the valve plate 12 is in the first position.
Figure 10:
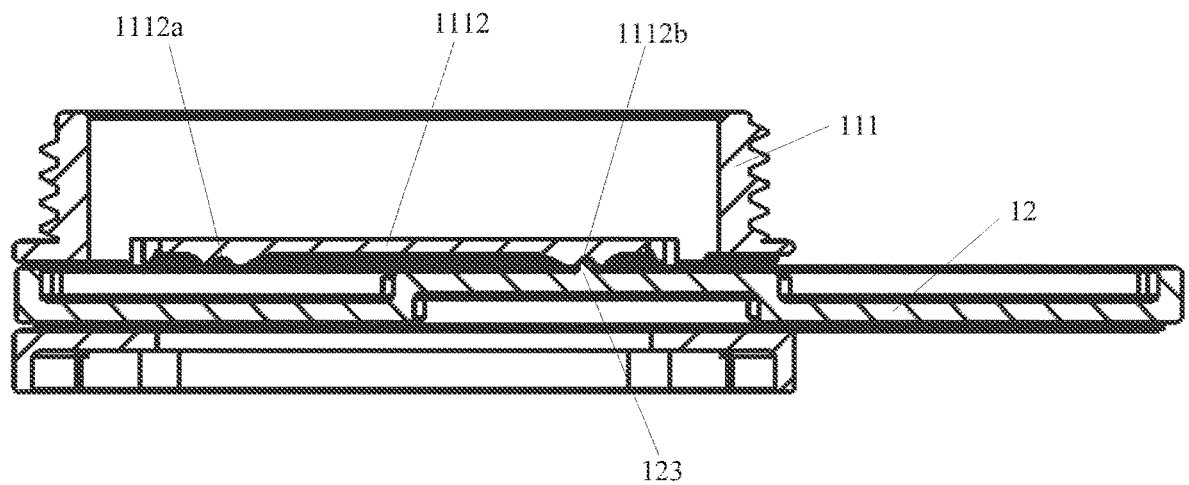
FIG. 10 schematically illustrates a cross-sectional view of the valve seat 111 and the valve plate 12 according to the embodiment shown in FIG. 8 along a line AA1 in FIG. 8.

Referring to FIGS. 8, 9 and 10, FIG. 8 schematically illustrates a top view of the valve seat 111 and the valve plate 12 of the water valve 10 according to the embodiment shown in FIG. 1 when the valve plate 12 is in the first position, FIG. 9 schematically illustrates a structural diagram of the valve seat 111 and the valve plate 12 of the water valve 10 in another perspective according to the embodiment shown in FIG. 1 when the valve plate 12 is in the first position, and FIG. 10 schematically illustrates a cross-sectional view of the valve seat 111 and the valve plate 12 according to the embodiment shown in FIG. 8 along a line AA1 in FIG. 8.

In some embodiments, the water valve 10 may further include a third limit assembly, and the valve plate 12 is positioned at the first position or the second position via the third limit assembly. Specifically, the third limit assembly may include a first groove 1112a and a second groove 1112b disposed on the stop plate 1112, and a protrusion 123 disposed on the valve plate 12, where the first groove 1112a and the second groove 1112b are disposed at an interval along a sliding direction of the valve plate 12, when the protrusion 123 slides into the first groove 1112a, the valve plate 12 is positioned at the first position, the valve plate opening 121 is aligned with the first pipe 1111 (as shown in FIG. 4), and when the protrusion 123 slides into the second groove 1112b, the valve plate 12 is positioned at the second position, the ring-shaped rib 122 is aligned with an opening at one end of the first pipe 1111 (as shown in FIG. 5). Therefore, the interval between the first groove 1112a and the second groove 1112b along the sliding direction of the valve plate 12 may be set to be equal to a distance between a center of the valve plate opening 121 and a center of the ring-shaped rib 122.

In some embodiments, the first groove 1112a and the second groove 1112b may be disposed on each stop plate 1112, and a protrusion 123 (as shown in FIG. 6) may be disposed on each side of the valve plate 12 disposed between the stop plate 1112 and the valve seat 111. In other embodiments, only one of the two stop plates 1112 may be provided with the first groove 1112a and the second groove 1112b, and a protrusion 123 may be disposed on one side of the valve plate 12 corresponding to the one stop plate 1112.

It can be seen from the above that, the protrusion, the first groove and the second groove collectively constitute the first limit assembly to stably keep the water valve in an open or closed state so as to prevent the valve plate from sliding near the first position or the second position, thereby improving performance of the water valve.

It can be known from the background art that, in the prior art, in the method for disinfecting water in a pool using disinfectant tablets or a floating chemical dispenser, disinfectant solutions cannot diffuse to a large area, thereby failing to achieve an expected disinfection effect. In order to solve the technical problem, a water valve is provided according to embodiments of the present disclosure, where the water valve may include a chemical dispenser.

With continued reference to FIGS. 1 to 5, in some embodiments, the water valve 10 may further include a chemical dispenser 13 connected with the valve body 11.

Specifically, the chemical dispenser 13 may include: a first housing 131 detachably connected with the valve body 11 and including a third pipe 1311; and a second housing 132 detachably connected with the first housing 131 and including a fourth pipe 1321. In some embodiments, the first housing 131 may be meshed with the second housing 132 via an inner thread 1311c disposed on an inner surface of the third pipe 1311 and an outer thread 1321c disposed on an outer surface of the fourth pipe 1321. In other embodiments, the first housing 131 may be connected with the second housing 132 via a slot disposed on the first housing 131 and a fastener disposed on the second housing 132. It will be appreciated that embodiments of the present disclosure are not limited thereto.

The first housing 131 and the second housing 132 collectively define a second chamber 13a for receiving chemicals. At least one first hole 1312 is disposed on the first housing 131 to make the second chamber 13a communicated with an external environment. In some embodiments, there may be a plurality of first holes 1312 disposed on the first housing 131, for example, the number of the first holes 1312 may be two, three, four or five, and the present disclosure imposes no restriction on this. In some embodiments, the plurality of first holes 1312 may be evenly distributed at a bottom portion of the first housing 131. With the at least one first hole 1312, water in the external environment can enter the second chamber 13a so that the solid chemicals in the second chamber 13a can be dissolved to form a chemical solution.

In addition, the third pipe 1311 and the fourth pipe 1321 may be detachably connected and collectively define a second channel 13b, where the second channel 13b may be communicated with the first channel 11b.

Figure 11:
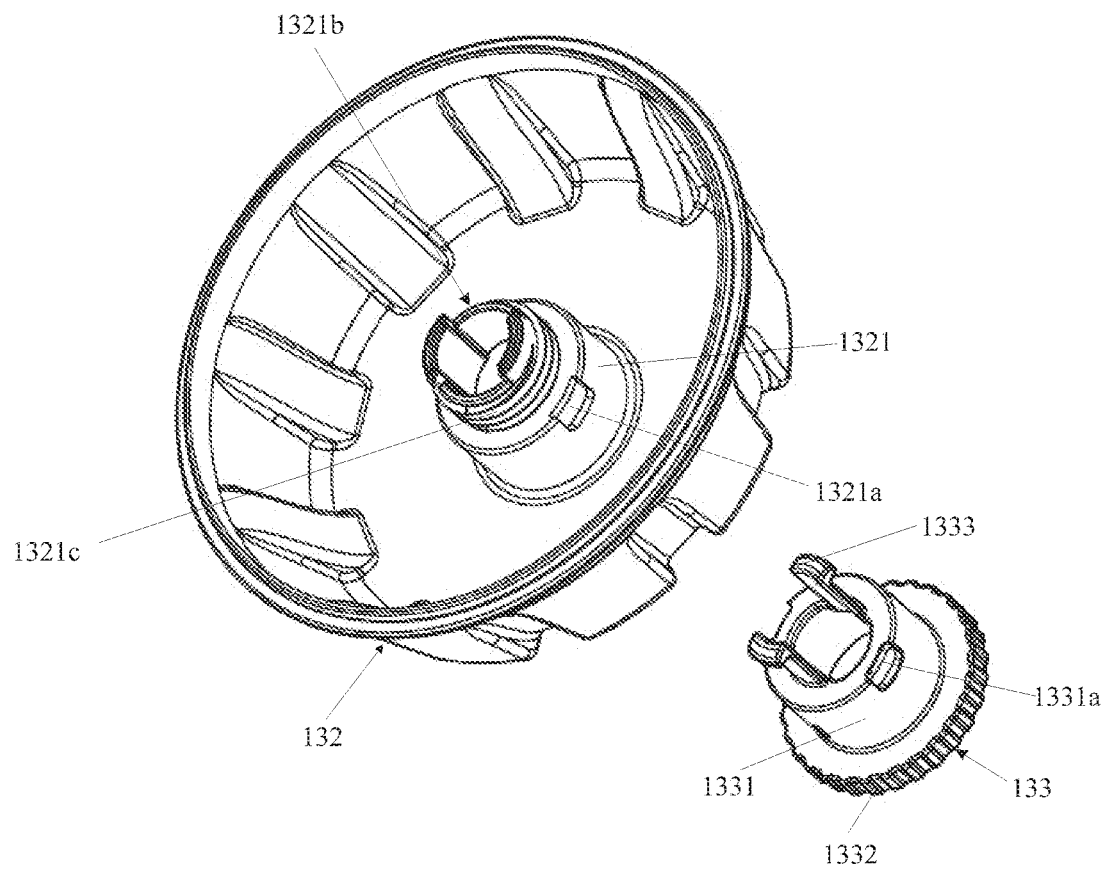
FIG. 11 schematically illustrates a structural diagram of a second housing 132 and a control member 133 of the water valve 10 according to the embodiment shown in FIG. 1.

In conjunction with reference to FIG. 11, FIG. 11 schematically illustrates a structural diagram of the second housing 132 and a control member 133 of the water valve 10 according to the embodiment shown in FIG. 1. In some embodiments, at least one second hole 1321a may be disposed on the fourth pipe 1321 so that the second chamber 13a is communicated with the second channel 13b, for example, the at least one second hole 1321a may be disposed on a pipe wall of the fourth pipe 1321. A negative pressure may be generated when water flows through the second channel 13b, which can suck chemical solution out of the second chamber 13b via the at least one second hole 1321a and the chemical solution can further flow out of the second channel 13b under water flow effect (a direction of the water flow is indicated by arrows shown in FIG. 4).

It can be concluded from the above that, an end of the first channel 11b away from the second channel 13b may serve as a water inlet of the water valve 10, and an end of the second channel 13b away from the first channel 11b may serve as a water outlet of the water valve 10. In some embodiments, the water inlet of the water valve 10 may be connected with a water inlet part of a pool, an amount of water entering the pool can be controlled by sliding the valve plate 12, and besides the water in the pool can be sterilized and disinfected via the chemical dispenser 13 of the water valve 10.

In some embodiments, the chemical dispenser 13 may further include a control member 133 detachably connected with the second housing 132 for opening or closing the at least one second hole 1321a. Specifically, the control member 133 may include a fifth pipe 1331 and a hand wheel 1332 connected with one end of the fifth pipe 1331, and the other end of the fifth pipe 1331 may be configured to be inserted into the fourth pipe 1321 and rotated in the fourth pipe 1321, and the hand wheel 1332 extends out of the fourth pipe 1321 and the second housing 132 so that a user can rotate the fifth pipe 1331 by rotating the hand wheel 1332. At least one third hole 1331a may be disposed on a pipe wall of the fifth pipe 1331; when the at least one third hole 1331a is overlapped with the at least one second hole 1321a, the at least one second hole 1321a is opened, and the chemical solution in the second chamber 13a can flow out to the second channel 13b via the at least one second hole 1321a; and when there is no overlap between the at least one third hole 1331a and the at least one second hole 1321a, the at least one second hole 1321a is closed.

In some embodiment, the number of the at least one third hole 1331a and the number of the at least one second hole 1321a may be the same, for example, there may be four third holes 1331a and four second holes 1321a evenly distributed on the pipe wall of the fifth pipe 1331 and a pipe wall of the fourth pipe 1321 respectively.

In some embodiments, a second slot 1321b may be disposed on the fourth pipe 1321, a second hook 1333 may be disposed on the fifth pipe 1331, and the second hook 1333 is configured to pass through the second slot 1321b, hook the pipe wall of the fourth pipe 1321 and slide within the second slot 1321b.

Figure 12:
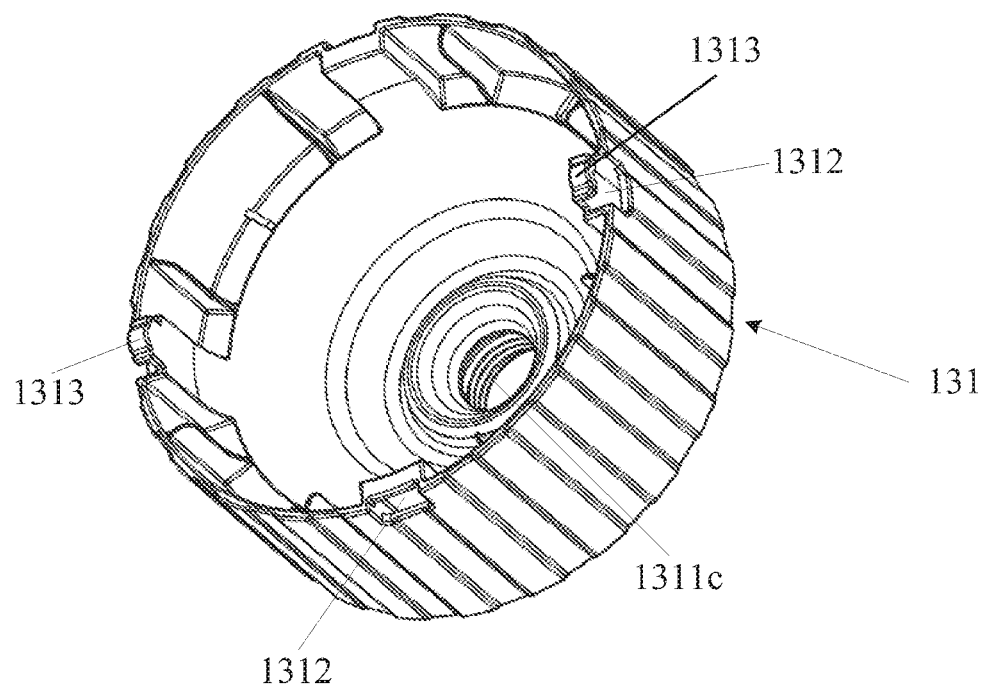
FIG. 12 schematically illustrates a structural diagram of the first housing 131 of the water valve 10 according to the embodiment shown in FIG. 1.
Figure 13:
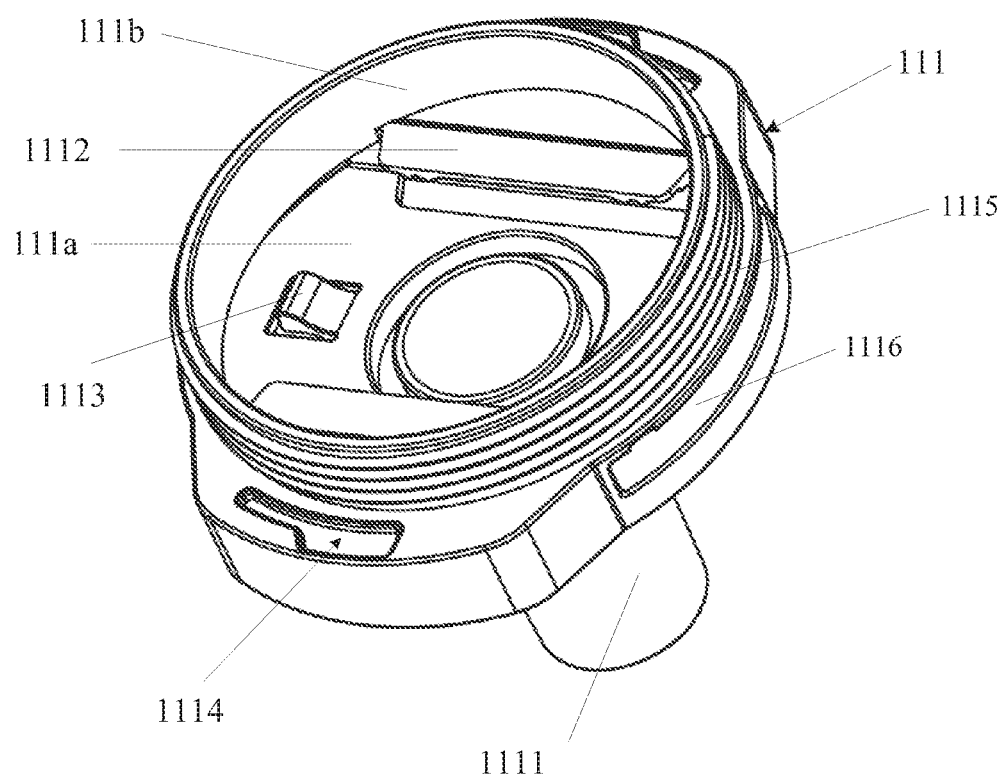
FIG. 13 schematically illustrates a structural diagram of the valve seat 111 of the water valve 10 according to the embodiment shown in FIG. 1.

In some embodiments, the first housing 131 of the chemical dispenser 13 may be connected with the valve body 11 via a second connecting assembly. Referring to FIGS. 12 and 13, FIG. 12 schematically illustrates a structural diagram of the first housing 131 of the water valve 10 according to the embodiment shown in FIG. 1, and FIG. 13 schematically illustrates a structural diagram of the valve seat 111 of the water valve 10 according to the embodiment shown in FIG. 1. The second connecting assembly may include a third slot 1114 disposed on the valve seat 111 and a third hook 1313 disposed on the first housing 131, where a width of a first end of the third slot 1114 is greater than a width of a second end of the third slot 1114, and the third hook 1313 is configured to be inserted into the first end of the third slot 1114, slide in the third slot 1114 to the second end of the third slot 1114 and be hooked on a lower surface of the valve seat 111. Specifically, when the third hook 1313 is positioned at the first end of the third slot 1114, the chemical dispenser 13 can be separated from the valve body 11; and when the third hook 1313 is positioned at the second end of the third slot 1114, the chemical dispenser 13 is connected with the valve body 11.

In some embodiments, there may be two third slots 1114 (as shown in FIG. 6) symmetrically disposed on both sides of the sidewall 111b of the valve seat 111. Correspondingly, two third hooks 1313 may be disposed on positions of the first housing 131 corresponding to the two third slots 1114. In other embodiments, the at least one third slot 1114 and the at least one third hook 1313 may have other numbers and may be in other arrangements, the present disclosure imposes no restriction on this; and the chemical dispenser 13 and the valve body 11 may also be connected by other means, for example, by a fastener disposed on the chemical dispenser 13 and a slot disposed on the valve body 11, etc. The present disclosure imposes no restriction on this.

It can be seen from the above that, the water valve according to embodiments of the present disclosure is an integrated system of the valve body and the chemical dispenser, which not only has a switch function of the valve body to control opening and closing of water flow, but also has a disinfection function of the chemical dispenser to dispense chemical solution so as to sterilize water in the surrounding environment.

A pool is also provided according to an embodiment of the present disclosure. Referring to FIGS. 4 and 5, the pool may include a water inlet part 21 connected with a pool wall 20; and the water valve 10 according to the above embodiments, where the water valve 10 is detachably connected with the water inlet part 21. The water inlet part 21 may include a water pipe part 211 and a connecting part 212 connected with the water pipe part 211, the connecting part 212 is connected with the pool wall 20, and at least a part of the water valve 10 is configured to be inserted into the water pipe part 211. Specifically, the first pipe 1111 of the water valve 10 is configured to be inserted into the water pipe part 211.

In some embodiment, the connecting part 212 is welded to the pool wall 20, the first pipe 1111 is directly inserted into the water pipe part 211, or the first pipe 1111 is meshed with the water pipe part 211 via an external thread disposed on an outer surface of the first pipe 1111 and an internal thread disposed on an inner surface of the water pipe 211. The present disclosure imposes no restriction on this.

In some embodiments, the water inlet part 21 of the pool is configured to be connected with an outlet of a filter pump (not shown) or a water pump (not shown) via a connecting pipe (not shown), an inlet of the filter pump or the water pump is configured to be connected with an outlet (not shown) of the pool to form a water cycle. Specifically, the filter pump may include a sand filter, the connecting pipe may be a bellows, but types of the filter pump and the connecting pipe are not limited thereto. Since the filter pump or the water pump has a higher lift, the water pressure can force the water to be sprayed to a long distance when being ejected from the water valve 10, so that the chemical solution in the chemical dispenser 13 of the water valve 10 can also be sprayed to a longer distance under the effect of water flow. Therefore, the chemical solution can diffuse to a larger area, enhancing disinfection of water in the pool.

In conclusion, the water valve according to embodiments of the present disclosure includes a valve body and a valve plate, wherein the valve body is provided with a first channel, the valve plate is provided with a valve plate opening, and alignment between the first channel and the valve plate opening is controlled by sliding the valve plate so as to control opening or closing of the water valve. The operation is simple and easy to implement.

Further, the water valve includes a chemical dispenser connected with the valve body, the chemical dispenser is provided with a second chamber for receiving solid chemicals and at least one first hole configured to make the second chamber communicated with an external environment, the chemical dispenser is further provided with a second channel communicated with the first channel and at least one second hole configured to make the second chamber communicated with and the second channel. A negative pressure will be generated when water flows through the second channel, which may suck chemical solution out of the second chamber via the at least one second hole and the chemical solution may further flow out of the second channel under the water flow effect. Therefore, the water valve according to the embodiments of the present disclosure is an integrated system of the valve body and the chemical dispenser, which not only has a switch function of the valve body to control opening and closing of water flow, but also has a disinfection function of the chemical dispenser to dispense chemical solution so as to sterilize water in the surrounding environment.

Further, the water valve includes: the first limit assembly configured to limit movement of the valve plate in a first predetermined direction when the valve plate is positioned in the first position; and the second limit assembly, configured to abut against the valve seat when the valve plate is positioned in the second position to limit movement of the valve plate in a second predetermined direction, where the first predetermined direction is opposite to the second predetermined direction, thereby preventing the valve plate from slipping out of the valve body or missing which may result in water leakage.

Further, a stop plate is further disposed on the valve seat, a first groove and a second groove are disposed on the stop plate, a protrusion is disposed on the valve plate, and the protrusion, the first groove and the second groove collectively constitute the third limit assembly to stably keep the water valve in an open or closed state so as to prevent the valve plate from sliding near the first position or the second position, thereby improving performance of the water valve.

Further, a sealing ring is disposed at an end of the first pipe near the valve plate, and a ring-shaped rib is disposed on the valve plate. When the valve plate is positioned at the second position, the ring-shaped rib abuts against the sealing ring to prevent the water valve from leakage, thereby achieving good sealing performance of the water valve.

The pool according to embodiments of the present disclosure may include a water inlet part and the water valve, wherein the water inlet part may include a water pipe part and a connecting part connected with the water pipe part, at least a part of the water valve is configured to be inserted into the water pipe part. That is, the water valve can be connected with the water inlet part of the pool instead of a plug, so as to act as a switch for controlling opening or closing of water flow. Since it is simple and labor-saving to operate the valve plate to control the opening or closing of the water valve, difficulty in operation can be avoided when a user inserts the plug into or pulls the plug out of a water inlet or a water outlet of the pool. Additionally, since the water valve and the water inlet part are hermetically connected, and the valve plate is hermetically connected with the first pipe when positioned in the second position, water leakage can be avoided when the water valve is in a closed state.

Further, the water valve of the pool may further include a chemical dispenser, and the chemical solution in the chemical dispenser can be sucked out and discharged to the pool via the second channel. The water valve is an integrated system of the valve body and the chemical dispenser, which not only has a switch function of the valve body to control opening and closing of water flow, but also has a disinfection function of the chemical dispenser to dispense chemical solution so as to sterilize water in the pool. In addition, since the chemical dispenser is connected with the valve body, the valve body is connected with the water inlet part of the pool, a position of the chemical dispenser is relatively fixed and the chemical solution in the chemical dispenser can diffuse to a larger area under effect of water flow of the water inlet part, which not only avoids easy sinking of the conventional disinfectant tablets into a bottom of the pool and its failure in diffusing to a large area of the pool, but also solves the problem of the conventional floating chemical dispenser drifting to corners of the pool under wind force and influencing the disinfection effect. Therefore, the chemical dispenser disposed in the water valve according to embodiments of the present disclosure enhances the disinfection effect of the water.

Although the present disclosure has been described above, the present disclosure is not limited thereto. It should be understood by those skilled in the art that various changes and modifications may be made without departing from the spirit and scope of the disclosure, and therefore, the scope of the disclosure should be limited by the scope of the claims.

What is claimed is:

1. A water valve, applied to a pool, comprising:
a valve body, provided with a first channel;
a valve plate, provided with a valve plate opening and configured to control opening or closing of the first channel by sliding;
wherein when the valve plate is positioned in a first position, the valve plate opening is aligned with the first channel so that water can flow through the first channel, and the water valve is in an open state; and when the valve plate is positioned in a second position, the first channel is blocked by the valve plate so that water cannot flow through the first channel, and the water valve is in a closed state; and
a first limit assembly, configured to limit movement of the valve plate in a first predetermined direction, when the valve plate is positioned in the first position;
wherein the first limit assembly comprises a slot disposed on the valve plate and a hook disposed on the valve seat, the hook comprises a vertical plane and an oblique plane, when the valve plate is positioned in the first position, the vertical plane of the hook abuts against an end of the slot;
wherein the valve body comprises:
a valve seat, provided with a first pipe; and
a valve housing, detachably connected with the valve seat and comprising a second pipe;
wherein a pipe channel of the first pipe and a pipe channel of the second pipe collectively define the first channel, the valve plate is disposed between the first pipe and the second pipe, and when the valve plate opening is aligned with the pipe channel of the first pipe and the pipe channel of the second pipe, the first pipe is communicated with the second pipe.

2. The water valve according to claim 1, wherein a first opening and a second opening are disposed on the valve seat, the valve plate passes through the first opening and the second opening and is configured to slide within the first opening and the second opening.

3. The water valve according to claim 1, further comprising: a second limit assembly disposed at an end of the valve plate and configured to abut against the valve seat to limit movement of the valve plate in a second predetermined direction when the valve plate is positioned in the second position.

4. The water valve according to claim 3, further comprising a stop plate disposed on the valve seat, wherein the stop plate and the valve seat define a slideway of the valve plate, and the valve plate is disposed between the stop plate and the valve seat.

5. The water valve according to claim 4, further comprising: a third limit assembly, wherein the valve plate is positioned in the first position or the second position via the third limit assembly; and
the third limit assembly comprises: a first groove and a second groove disposed on the stop plate, and a protrusion disposed on the valve plate, wherein the first groove and the second groove are disposed at an interval along a sliding direction of the valve plate, when the protrusion slides into the first groove, the valve plate is positioned in the first position, and when the protrusion slides into the second groove, the valve plate is positioned in the second position.

6. The water valve according to claim 1, further comprising:
a sealing ring, disposed at an end of the first pipe near the valve plate; and/or
a ring-shaped rib, disposed on the valve plate, wherein the ring-shaped rib abuts against the sealing ring when the valve plate is positioned in the second position.

7. A water valve, applied to a pool, comprising:
a valve body, provided with a first channel; and
a valve plate, provided with a valve plate opening and configured to control opening or closing of the first channel by sliding;
wherein when the valve plate is positioned in a first position, the valve plate opening is aligned with the first channel so that water can flow through the first channel, and the water valve is in an open state; and when the valve plate is positioned in a second position, the first channel is blocked by the valve plate so that water cannot flow through the first channel, and the water valve is in a closed state; and
a chemical dispenser connected with the valve body, wherein the chemical dispenser is provided with a chamber for receiving solid chemicals and at least one first hole configured to make the chamber communicated with an external environment.

8. The water valve according to claim 7, wherein the chemical dispenser is farther provided with a second channel communicated with the first channel and at least one second hole configured to make the chamber communicated with and the second channel, and chemical solution in the chamber can be discharged via the at least one second hole when water flows through the second channel.

9. The water valve according to claim 8, wherein the chemical dispenser further comprises:
a first housing, detachably connected with the valve body and comprising a third pipe; and
a second housing, detachably connected with the first housing and comprising a fourth pipe;
wherein the first housing and the second housing collectively define the chamber, the third pipe and the fourth pipe are connected and collectively define the second channel, and the at least one second hole is disposed on the fourth pipe.

10. The water valve according to claim 9, wherein the chemical dispenser further comprises:
a control member detachably connected with the second housing and configured to open or close the at least one second hole.

11. The water valve according to claim 10, wherein the control member comprises: a fifth pipe and a hand wheel connected with one end of the fifth pipe, the other end of the fifth pipe is configured to be inserted into the fourth pipe and rotated in the fourth pipe, and the hand wheel is configured to be rotated by a user so as to rotate the fifth pipe; and
at least one third hole is disposed on the fifth pipe, when the at least one third hole is overlapped with the at least one second hole, the at least one second hole is opened, and when the at least one third hole and the at least one second hole are non-overlapped, the at least one second hole is closed.

12. A pool, comprising:

a water inlet part, connected with a pool wall; and a water valve detachably connected with the water inlet part;

wherein the water valve comprises: a valve body, provided with a first channel; and a valve plate, provided with a valve plate opening and configured to control opening or closing of the first channel by sliding;

wherein when the valve plate is positioned in a first position, the valve plate opening is aligned with the first channel so that water can flow through the first channel, and the water valve is in an open state; and when the valve plate is positioned in a second position, the first channel is blocked by the valve plate so that water cannot flow through the first channel, and the water valve is in a closed state.

13. The pool according to claim 12, wherein the water inlet part comprises a water pipe part and a connecting part connected with the water pipe part, the connecting part is connected with the pool wall, and at least a part of the water valve is configured to be inserted into the water pipe part.

14. A water valve, applied to a pool, comprising:

a valve body, provided with a first channel; and a valve plate, provided with a valve plate opening and configured to control opening or closing of the first channel by sliding;

wherein when the valve plate is positioned in a first position, the valve plate opening is aligned with the first channel so that water can flow through the first channel, and the water valve is in an open state; and when the valve plate is positioned in a second position, the first channel is blocked by the valve plate so that water cannot flow through the first channel, and the water valve is in a closed state; and a stop plate disposed on the valve seat, wherein the stop plate and the valve seat define a slideway of the valve plate, and the valve plate is disposed between the stop plate and the valve seat;

wherein the valve body comprises:

a valve seat, provided with a first pipe; and a valve housing, detachably connected with the valve seat and comprising a second pipe;

wherein a pipe channel of the first pipe and a pipe channel of the second pipe collectively define the first channel, the valve plate is disposed between the first pipe and the second pipe, and when the valve plate opening is aligned with the pipe channel of the first pipe and the pipe channel of the second pipe, the first pipe is communicated with the second pipe.

15. The water valve according to claim 14, further comprising: a first limit assembly, configured to limit movement of the valve plate in a first predetermined direction, when the valve plate is positioned in the first position;

wherein the first limit assembly comprises a slot disposed on the valve plate and a hook disposed on the valve seat, the hook comprises a vertical plane and an oblique plane, when the valve plate is positioned in the first position, the vertical plane of the hook abuts against an end of the slot.

16. The water valve according to claim 15, further comprising: a second limit assembly disposed at an end of the valve plate and configured to abut against the valve seat to limit movement of the valve plate in a second predetermined direction when the valve plate is positioned in the second position.

17. The water valve according to claim 16, further comprising: a third limit assembly, wherein the valve plate is positioned in the first position or the second position via the third limit assembly.

18. The water valve according to claim 17, wherein the third limit assembly comprises: a first groove and a second groove disposed on the stop plate, and a protrusion disposed on the valve plate, wherein the first groove and the second groove are disposed at an interval along a sliding direction of the valve plate, when the protrusion slides into the first groove, the valve plate is positioned in the first position, and when the protrusion slides into the second groove, the valve plate is positioned in the second position.

* * * * *